United States Patent
König et al.

(10) Patent No.: US 8,132,993 B2
(45) Date of Patent: Mar. 13, 2012

(54) SCREW CONNECTION FOR A FIXED CONNECTION OF TWO ASSEMBLIES

(75) Inventors: Gottfried König, Bad Laasphe (DE); Uwe Rausch, Tambach-Dietharz (DE)

(73) Assignee: EJOT GmbH & Co. KG, Bad Laasphe (DE)

( * ) Notice: Subject to any disclaimer, the term of this patent is extended or adjusted under 35 U.S.C. 154(b) by 0 days.

(21) Appl. No.: 12/748,052

(22) Filed: Mar. 26, 2010

(65) Prior Publication Data

US 2010/0247268 A1    Sep. 30, 2010

(30) Foreign Application Priority Data

Mar. 27, 2009    (DE) .................. 10 2009 015 376

(51) Int. Cl.
*F16B 25/00*    (2006.01)
(52) U.S. Cl. ........................ 411/386; 411/231
(58) Field of Classification Search .................. 411/386, 411/301, 437; 403/286, 402, 403
See application file for complete search history.

(56) References Cited

U.S. PATENT DOCUMENTS

| | | | | |
|---|---|---|---|---|
| 3,927,437 A | * | 12/1975 | Ford | 16/94 R |
| 4,477,990 A | * | 10/1984 | Buchanan | 40/784 |
| 4,580,689 A | * | 4/1986 | Slater | 220/3.2 |
| 4,960,964 A | * | 10/1990 | Schnell et al. | 174/51 |
| 5,173,001 A | * | 12/1992 | Schunke | 403/252 |
| 5,807,008 A | * | 9/1998 | Schwenk et al. | 403/21 |
| 6,585,448 B2 | * | 7/2003 | Grossman et al. | 403/403 |
| 6,945,729 B2 | * | 9/2005 | Yasuda | 403/408.1 |

FOREIGN PATENT DOCUMENTS

| | | |
|---|---|---|
| DE | 88 10 628.4 U1 | 10/1988 |
| DE | 83 10 628.4 U1 | 12/1988 |
| DE | 201 12 171 U1 | 11/2001 |
| DE | 100 55 405 B4 | 5/2002 |
| DE | 103 50 887 A1 | 5/2005 |

* cited by examiner

*Primary Examiner* — Gary Estremsky
(74) *Attorney, Agent, or Firm* — Birch, Stewart, Kolasch & Birch, LLP

(57) ABSTRACT

Screw connection for a fixed connection of two assemblies which are mounted to each other in a variable position, using a connecting member penetrated by a screw. The connecting member is mounted between the assemblies by means of a self-cutting screw penetrating the connecting member and one of the assemblies, which screw is grooving its thread into both parts in such a way that, starting from a stable end position of the one assembly and the connecting member, the screw is adapted to be screwed into the connecting member as well as into the one assembly by means of thread grooves such that, by means of the self-cutting thread of the screw, the connecting member and the one assembly are held in a fixed position with respect to each other, and the other assembly is fastened directly to the connecting member.

7 Claims, 2 Drawing Sheets

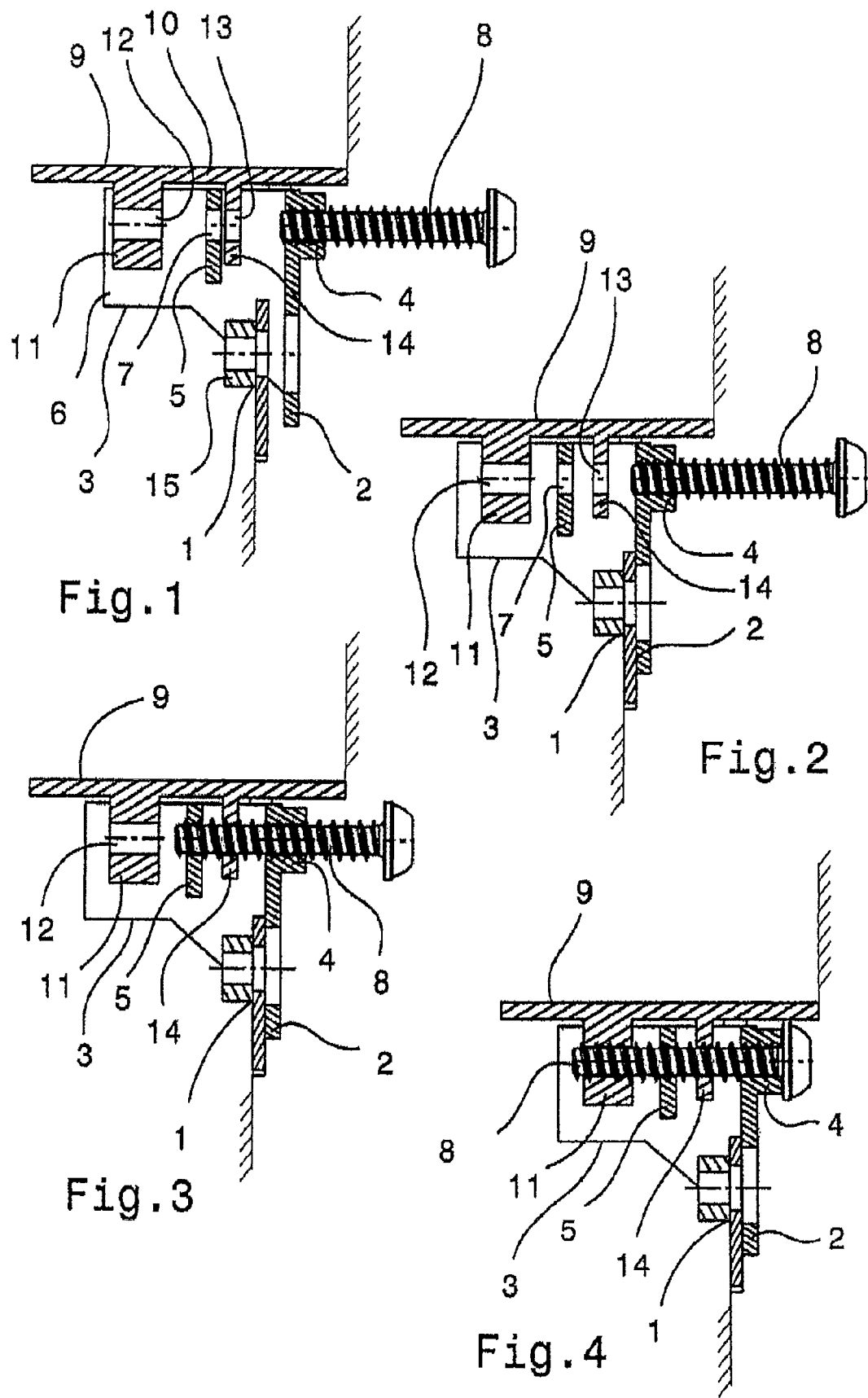

SCREW CONNECTION FOR A FIXED CONNECTION OF TWO ASSEMBLIES

CROSS-REFERENCE TO RELATED APPLICATIONS

The present application claims priority under 35 USC 119 to German Patent Application No. 10 2009 015 376.4 filed on Mar. 27, 2009 the entire contents of which are hereby incorporated by reference.

FIELD OF THE INVENTION

The invention relates to a screw connection for a fixed connection of two assemblies which are mounted in a variable position with respect to each other, using a connecting member penetrated by a screw.

DESCRIPTION OF BACKGROUND ART

Making a fixed connection of two assemblies is frequently encountered, in particular in the area of the production of furniture where furniture parts, in particular those which meet each other at right angles, are to be brought into engagement with each other, wherein a fixed connection is established by means of screws. Therein, the problem is frequently encountered that, because of inaccuracies during production, the respective receiving portions for screws, i.e. a hole for a screw head and a bore for a screw thread, are positioned not coaxially to each other such that is necessary to provide for a possibility for correction. In most cases, this is achieved wherein a seat serving for receiving a connecting screw, for a head of a screw is embraced with clearance whereby a corresponding possibility for correction is given for a connecting member connecting two furniture parts (here DE Utility Model G 88 10 628.4, page 3, first paragraph).

However, such a possibility for correction proves to be unfeasible when the two parts to be connected to each other, are subjected to vibrations during use such that they tend to be displaced with respect to each other which results in that the respective fastening means can migrate backwards and forwards in the enlarged receiving hole. Such a possibility of correction is unfeasible for many purposes, in particular in automobile construction where particular assemblies are to be fixed separately to the car body wherein production inaccuracies have to be accepted for the car body as well as for the respective assemblies, but where, in spite of this, a connection has to guarantee a stable, undisplaceable seat in the end.

SUMMARY AND OBJECTS OF THE INVENTION

This problem is solved in a screw connection for a fixed connection of two assemblies which are mounted to each other in a variable position, using a connecting member penetrated by a screw, thereby that the connecting member is mounted between the assemblies by means of a self-cutting screw penetrating the connecting member and one of the assemblies, which screw is grooving its thread into both parts in such a way that, starting from a stable end position of the one assembly and the connecting member, the screw is adapted to be screwed into the connecting member as well as into the one assembly by means of thread grooves such that, by means of the self-cutting thread of the screw, the connecting member and the one assembly are held in a fixed position with respect to each other, and the other assembly is fastened directly to the connecting member.

In this arrangement, the property of the self-cutting screw to maintained the in the beginning variable, after screwing in of the screw, however, then fixed distance, since two assemblies are provided with a thread by self-cutting upon screwing in of the screw in its given position, respectively, such that, by means of the thread and the screw, the two assemblies are held undisplaceable in the position in which the assembling of the assemblies is such that, also after assembling the two assemblies, they are consequently held stably in their position taken during screwing-in of the screw. Such a connecting member is adapted to be appropriately designed such that the connecting member and the one assembly are provided with protrusions each of which comprise coaxial bores for taking up of the screw which is adapted to be coaxially screwed into the bores such that the screw screwed into the bores secures the assembly and the connecting member in the position being obtained during screwing-in. By screwing in the self cutting screw into the coaxial bores in the two assemblies, the above-mentioned effect of securing the distance of the two assemblies is than resulting since the thread cut therein provides, by means of the screw, a connection which results from the respective position of the assemblies when they are fixed somewhere and are provided with a self-cutting screw.

In an advantages embodiment, the assemblies and the connecting member, respectively, are provided with several protrusions provided with a bore in order to produce a particularly stable, long lasting connection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 1 shows the connecting member between two assemblies in their starting position.

FIG. 2 shows the connecting member in a position directly moved to one of the two assemblies.

FIG. 3 shows the connecting member with a self cutting screw penetrating the connecting member and the one assembly.

FIG. 4 shows the connecting member with a self-cutting screw penetrating the connecting member and one assembly completely.

DETAILED DESCRIPTION OF THE PREFERRED EMBODIMENT

Figure 5:
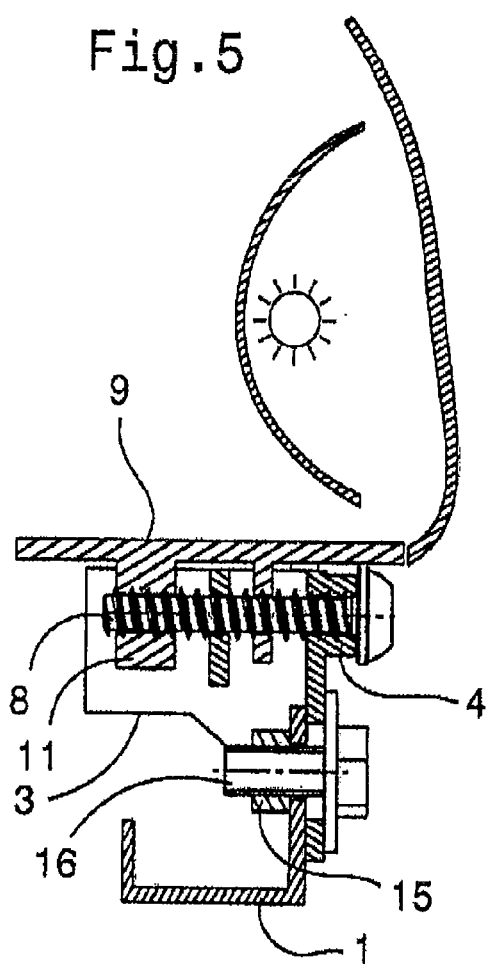
FIG. 5 shows the connecting member with the penetrating screw according to FIG. 4 and the second assembly fixed to the connecting member with a screw.

In FIG. 1, a first assembly 1 is shown which is addressed in more detail below with respect to its possible connection. The flange 2 of the connecting member 3 is juxtaposed to the first assembly 1, which member furthermore consists out of the mother piece 4 and the web 5 which is connected to the mother piece 4 by the wall 6. Consequently, the connecting member 3 consists of the flange 2, the mother piece 4, the wall 6 and the web 5. The mother piece 4 and the web 5 each comprise a bore (see bore 7) where the self-cutting screw 8 is screwed into the bore penetrating the mother piece 4. Juxtaposed to the connecting member 3 is a second assembly 9 which extends long the connecting member 3 with the bottom 10 to which the mother piece 11 is mounted. The mother piece 11 comprises the bore 12 which, in the assembled position shown in FIG. 1 of the connecting member 3 and the two assemblies 1 and 9, is coaxial with the bores 12 and 13 in the second assembly 9 and bore 7 in the web 5 and is coaxially aligned with the bore in the mother piece 4 penetrated by the screw 8. The extension 14 which extends approximately parallel to the web 5 of the connecting member 3 and is provided with a bore 13 coaxial with the bore 7, extends away from the bottom 10 of the assembly 9. FIG. 1 shows, furthermore, the welded nut 15 of the assembly 1 which ultimately is to be connected to the second assembly 9 by means of the connecting member 3.

FIG. 2 shows the starting phase of mounting the two assemblies 1 and 9 by means of the connecting member 3, whereby a position of the connecting member 3 is obtained in which the flange 2 thereof is abutting the assembly 1, and the web 5 of the connecting member 3 has moved more close to the mother piece 11. As can be seen, the bore containing the screw 8 as well as the further bores 13, 7 and 12 are coaxially aligned.

In order to securely connect the two assemblies 1 and 9 with each other by means of the connecting member, the screw 8 is now further screwed into the assembly 9 and into the connecting member 3, whereby, at first, the position shown in FIG. 3 obtained in which the screw 8 penetrates the bore in the mother piece 4 and bores 13 and 7, whereby the screw 8 has grooved a thread in each of the penetrated parts which results in that, by means of the thread of the screw 8, the parts each surrounding the screw are held axially in a defined distance by means of the thread of the screw 8. The connecting member 3 and the second assembly 9 consists of a material which allows the thread grooving, i.e. plastics or appropriately formable metal, for example.

The last phase of the production of the connection which is shown in FIG. 4 is now following in which the screw 8 is further screwed into the connecting member 3 and the second assembly 9, whereby the screw 8 finally completely penetrates also the mother piece 11 of the second assembly 9. By means of the screw 8 and the thread grooved thereby, there now exists a fixed connection between the mother piece 4 of the connecting member 3 through the extension 14 and the web 5 up to the mother piece 11. These parts penetrated in such a way by the self-cutting screw 8, are held by means of the thread of the screw 8 in their spacing which is assured by the thread grooved by the screw 8 in the respective parts. Therefore, a secure connection between the first assembly 1 and the second assembly 9 exists by means of the connecting member 3, which is now undisplaceably held by means of the thread of the self-cutting screw 8.

Now, the first assembly 1 may be fixed to the flange 2, as shown in FIG. 5, by means of the screw 16. In FIG. 5, a headlight as the second assembly 9, and a car body, as the first assembly 1 of an automobile, are shown as examples.

Figure 6:
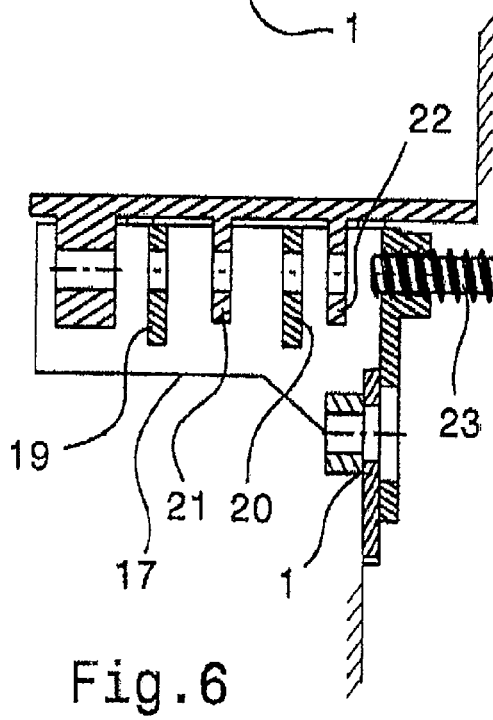
FIG. 6 shows a modification of the drawing of FIG. 2 with a connecting member being further out.

In FIG. 6, a modification of the arrangement according to the FIGS. 1 to 5 is shown which is about the fact that the connecting member 17 as well as the second assembly 9 are interlaced by means of webs 19, 20 and projections 21, 22 in order to achieve a particularly secure, axial anchoring of the two assemblies. This is achieved here thereby that the connecting member 17 comprises two webs 19 and 20, and the second assembly 9 comprises two projections 21 and 22. By means of this interlacing, plural mounting points are present for the respective fixation of two assemblies 1 and 9, when the screw 23 is completely screwed there through.

Figure 7:
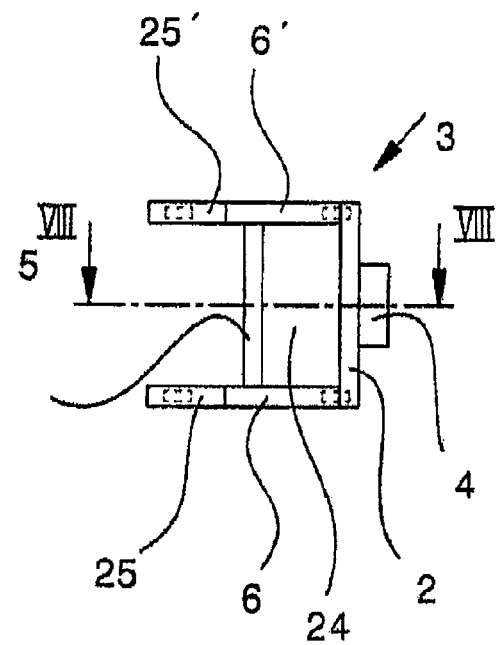
FIG. 7 shows a view of the connecting member alone.
Figure 8:
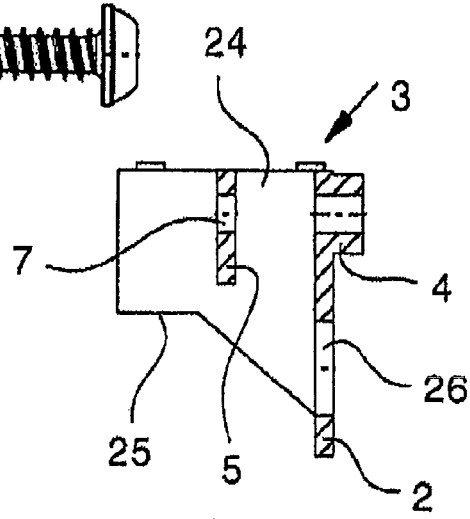
FIG. 8 shows a section along the line VIII-VIII of FIG. 7.

In the FIGS. 7 and 8, the connecting member 3 is shown alone, where FIG. 8 shows a section along the line VIII-VIII of FIG. 7.

The connecting member 3 according to FIG. 7 contains the flange 2 which is connected to the mother piece 4. The two walls 6 and 6' start from flange 2 (in the FIGS. 1 to 5 only the wall 6 is to be seen because of the sectional view), which walls enclose the web 5 between each other. The extension 14, which is not shown in FIG. 7, extends into the free space 24 in the combination of the FIGS. 1 to 5. The two walls 6 and 6' comprise the step 25 and 25' respectively, as can clearly seen from FIG. 8. The mother piece 4, the flange 2 and the web 5 are penetrated each by a bore which is shown in broken lines into which bore, thereafter, upon assembly, the self-cutting screw is screwed in, as is shown in FIGS. 4 to 6.

It is apparent from the sectional view according to FIG. 8, that the wall 6 supports the web 5 with bore 7, and that the mother piece 4 with the flange 2 is penetrated by a bore which is coaxially aligned with the bore 7. As shown by FIGS. 1 to 5, the two bores are, thereafter, be penetrated by the screw 8 later on upon assembling. The hole 26 contained in the flange 2, serves to take up a screw in order to fix, thereby, a further assembly to the flange 2. As concerns the mounting of such a screw 16, it is pointed to the view in FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A screw connection for providing a fixed connection between two assemblies which are mounted relative to each other in a variable position, comprising:
 a first assembly;
 a second assembly;
 a connecting member movably mounted between the first and second assemblies;
 a self-cutting screw penetrating the connecting member and the second assembly;
 the self-cutting screw forming a groove with threads into both the connecting member and the second assembly, wherein starting from a stable end position of the second assembly and the connecting member being movable to be adjacent to the first assembly, the self-cutting screw is adapted to be screwed into the connecting member as well as into the second assembly to hold the connecting member and the second assembly by means of the self-cutting screw secured within the groove with threads in the connecting member and the second assembly;
 by means of the self-cutting screw, the connecting member and the second assembly are held in a fixed position with respect to each other; and the first assembly is positioned adjacent to a flange of the connecting member wherein the second assembly is fastened directly to the connecting member,
wherein the connecting member and the second assembly, respectively, are each provided with several projections, and each of the projections is provided with a bore.

2. The screw connection according to claim 1, wherein the bores are coaxial with respect to each other for receiving the self-cutting screw which is adapted to be screwed into the bores such that the self-cutting screw screwed into the bores secures the second assembly and the connecting member in a position being obtained during screwing-in.

3. A screw connection for providing a fixed connection between two assemblies which are mounted relative to each other in a variable position, comprising:
 a first assembly;
 a second assembly;
 a connecting member movably mounted between the first and second assemblies; and
 a self-cutting screw for securing the connecting member to the second assembly;
 the self-cutting screw forming a groove with threads into both the connecting member and the second assembly;
 wherein starting from a fixed end position of the second assembly the connecting member is moved to be adjacent to the first assembly wherein the self-cutting screw is screwed into the connecting member as well as into the second assembly to hold the connecting member and the second assembly in a fixed relationship relative to each other by means of the self-cutting screw secured within the groove with threads in the connecting member and the second assembly;
 wherein said first assembly is positioned adjacent to a flange of the connecting member wherein when the second assembly is fastened directly to the connecting member, said flange enables the first assembly to be connected to the connecting member and the second assembly;
 wherein the connecting member and the second assembly, respectively, are provided with several projections, and each of the projections is provided with a bore.

4. The screw connection according to claim 3, wherein the bore are coaxial with respect to each other for receiving the self-cutting screw which is adapted to be screwed into the bores such that the self-cutting screw screwed into the bores secures the connecting member and the second assembly in a position being obtained during screwing-in.

5. A screw connection for providing a fixed connection between two assemblies which are mounted relative to each other in a variable position, comprising:
 a first assembly;
 a second assembly having a mother piece projecting therefrom;
 a connecting member having a mother piece and a web projecting therefrom, said connecting member being movably mounted between the first and second assemblies;
 a self-cutting screw for securing the mother piece and web of the connecting member to the mother piece of the second assembly;
 the self-cutting screw forming a groove with threads into both the mother piece and the web of the connecting member and the mother piece of the second assembly wherein starting from a fixed end position of the second assembly the connecting member is moved to be adjacent to the first assembly wherein the self-cutting screw is screwed into the mother piece and web of the connecting member as well as into the mother piece of the second assembly to hold the connecting member and the second assembly in a fixed relationship relative to each other by means of the self-cutting screw secured within the groove with threads in the mother piece and web of the connecting member and the mother piece of the second assembly; and
 a flange extending from the mother piece of the connecting member wherein said first assembly is positioned adjacent to said flange when the second assembly is fastened directly to the connecting member, said flange enables the first assembly to be connected to the connecting member and the second assembly;
 wherein the connecting member and the second assembly, respectively, are provided with at least two projections, and each of the projections is provided with a bore.

6. The screw connection according to claim 5, wherein bores are coaxial with respect to each other for receiving the self-cutting screw which is adapted to be screwed into the bores formed in the mother piece of the connecting member, into a bore formed in the web and a bore formed in the mother piece of the second assembly, wherein the self-cutting screw is screwed into the bores for securing the connecting member and the second assembly in a position being obtained during screwing-in.

7. Screw connection according to claim 5, wherein the connecting member includes a second web projecting therefrom, said second web including a bore for receiving the self-cutting screw.

* * * * *